US010284239B2

United States Patent
Kuriyama et al.

(10) Patent No.: US 10,284,239 B2
(45) Date of Patent: May 7, 2019

(54) ANTENNA DEVICE

(71) Applicant: Mitsubishi Electric Corporation, Tokyo (JP)

(72) Inventors: Tasuku Kuriyama, Tokyo (JP); Kazunari Kihira, Tokyo (JP); Masataka Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/539,765

(22) PCT Filed: Feb. 6, 2015

(86) PCT No.: PCT/JP2015/053399
§ 371 (c)(1),
(2) Date: Jun. 26, 2017

(87) PCT Pub. No.: WO2016/125305
PCT Pub. Date: Aug. 11, 2016

(65) Prior Publication Data
US 2018/0269911 A1    Sep. 20, 2018

(51) Int. Cl.
*H04B 1/10*    (2006.01)
*H04B 7/08*    (2006.01)
(Continued)

(52) U.S. Cl.
CPC .............. *H04B 1/10* (2013.01); *H01Q 3/38* (2013.01); *H04B 7/084* (2013.01); *H04B 7/086* (2013.01); *H04B 7/12* (2013.01)

(58) Field of Classification Search
CPC . H04B 1/10; H04B 7/12; H04B 7/084; H01Q 3/38
See application file for complete search history.

(56) References Cited

U.S. PATENT DOCUMENTS 6,108,565 A    8/2000    Scherzer
6,717,929 B1    4/2004    Ooba
(Continued)

FOREIGN PATENT DOCUMENTS

JP    2000-101494 A    4/2000
JP    2000-295169 A    10/2000
(Continued)

OTHER PUBLICATIONS

International Search Report issued in PCT/JP2015/053399; dated Mar. 24, 2015.
(Continued)

*Primary Examiner* — Kenneth T Lam
(74) *Attorney, Agent, or Firm* — Studebaker & Brackett PC (57) ABSTRACT

Disclosed is an antenna device including element antennas for receiving signals, phase control units for controlling the phases of the signals received by the element antennas, a phase value series acquiring unit for acquiring phase value series in which phase values differing among the element antennas and changing with time are provided, a phase value setting unit for setting the phase values to the phase control units in accordance with the phase value series, a combining unit for combining the signals whose phases are controlled into a composite signal, an ADC for digitizing the composite signal, a frequency calculating unit for calculating frequency shift amounts from the phase value series, DDCs for performing frequency conversion on the digitized signal by using the frequency shift amounts, LPFs each for performing low-pass filtering on the signal on which the frequency conversion is performed, and a beam forming unit for forming one or more beam signals by using the signals on each of which the low-pass filtering is performed.

2 Claims, 9 Drawing Sheets

(51) Int. Cl.
*H01Q 3/38* (2006.01)
*H04B 7/12* (2006.01)

(56) References Cited

U.S. PATENT DOCUMENTS

| | | | | |
|---|---|---|---|---|
| 7,054,397 | B1 | 5/2006 | Kawanabe | |
| 8,576,768 | B2* | 11/2013 | Zhao | H04B 1/0007 |
| | | | | 370/316 |
| 2004/0087294 | A1* | 5/2004 | Wang | H04B 7/086 |
| | | | | 455/276.1 |
| 2008/0204319 | A1* | 8/2008 | Niu | H01Q 3/26 |
| | | | | 342/368 |
| 2009/0058724 | A1* | 3/2009 | Xia | H01Q 3/2605 |
| | | | | 342/368 |
| 2009/0251368 | A1* | 10/2009 | McCune, Jr. | H01Q 3/267 |
| | | | | 342/368 |
| 2010/0013527 | A1* | 1/2010 | Warnick | H01Q 3/26 |
| | | | | 327/129 |
| 2010/0177840 | A1* | 7/2010 | Cabric | H04B 7/0848 |
| | | | | 375/295 |
| 2011/0033015 | A1* | 2/2011 | Park | H04B 7/084 |
| | | | | 375/347 |
| 2013/0337757 | A1* | 12/2013 | Szortyka | H04B 7/084 |
| | | | | 455/233.1 |
| 2017/0366982 | A1* | 12/2017 | Chang | H04W 16/28 |

FOREIGN PATENT DOCUMENTS

| | | |
|---|---|---|
| JP | 2003-032144 A | 1/2003 |
| JP | 2003-134017 A | 5/2003 |
| JP | 2003-521822 A | 7/2003 |
| JP | 2005-260720 A | 9/2005 |
| JP | 2013-051646 A | 3/2013 |

OTHER PUBLICATIONS

JP Office Action dated Nov. 7, 2017, from corresponding JP Appl No. 2016-573160, with English translation, 5 pp.

* cited by examiner

ANTENNA DEVICE

TECHNICAL FIELD

The present invention relates to an antenna device for performing digital beam forming, which is to form a beam with digital signals.

BACKGROUND ART

In recent years, in satellite communications, radars, etc., the need for formation of multiple beams and for reduction in the sidelobes of the antenna pattern has been increasing. Beam forming methodologies that satisfy this need includes a DBF, which is a beam forming methodology that uses digital signal processing. The DBF includes analog circuits, such as filters, amplifiers, down converters and AD converters (ADCs: Analog to Digital Converters), the number of analog circuits being equal to the number of element antennas (the number of systems). Then, the DBF multiples digitized signals of the element antennas by an excitation coefficient, and, after that, combines the digitized signals to form a beam. Because this DBF forms a beam by performing digital signal processing, the DBF can easily carry out formation of multiple beams and high-accuracy control of the antenna pattern.

A problem is, however, that the above-mentioned DBF have to include a plurality of analog circuits whose number is equal to the number of systems. Especially, the power consumption of each ADC is relatively higher than those of the other analog circuits, and its cost is also higher than those of the other analog circuits. Therefore, a problem with an antenna device using DBF is that its cost and its power consumption are high.

As a method of implementing DBF at a low cost and with low power consumption, there is, for example, an adaptive array antenna device described in Patent Literature 1. This adaptive array antenna device includes switches provided respectively for a plurality of element antennas, and switches on and off the switches in such a way as to receive a received signal of each of the element antennas in a time-division manner. Because this adaptive array antenna device simply has a single system of analog circuits, the number of ADCs which is a key factor of the cost and the power consumption can be reduced to one.

CITATION LIST

Patent Literature

Patent Literature 1: Japanese Unexamined Patent Application Publication No. 2013-51646

SUMMARY OF INVENTION

Technical Problem

However, a problem with the adaptive array antenna device disclosed in Patent Literature 1 is that because there is only one element antenna for which a corresponding switch is switched on at a certain time, no signal can be received at a time when each switch is switched on or off, the signal to noise ratio (SNR) gets worse. A further problem is that because this adaptive array antenna device is configured so as to use switches, when carrying out replacement or the like of an existing phased array antenna of analog beam forming type which uses phase shifters, it is necessary make a large change to the analog circuits.

The present invention is made in order to solve the above-mentioned problems, and it is therefore an object of the present invention to provide an antenna device that can implement reduction in the cost and reduction in the power consumption and can improve degradation in the SNR, as compared with conventional configurations, and that can also implement DBF even in a case in which the antenna device has a phased array antenna configuration of analog beam forming type.

Solution to Problem

According to an aspect of the present invention, there is provided an antenna device including: a plurality of element antennas for receiving signals, each element antenna being provided in an individual system; a plurality of phase shifters provided for the respective systems, each phase control unit being provided to control a phase of a signal received by a corresponding one of the element antennas; a phase value series acquiring unit for acquiring phase value series in which phase values differing among the systems and changing with time are provided; a phase value setting unit for setting a phase value to each phase shifter in accordance with the phase value series acquired by the phase value series acquiring unit; a combining unit for combining signals whose phases are controlled respectively by the plurality of phase shifters to provide a composite signal; an AD converter for digitizing the composite signal provided from the combining unit; a frequency calculating unit for calculating a frequency shift amount for each system from the phase value series acquired by the phase value series acquiring unit; a plurality of frequency converting units provided for the respective systems, each frequency converting unit being provided to perform frequency conversion on the signal digitized by the AD converter by using a corresponding frequency shift amount calculated by the frequency calculating unit; a plurality of filtering units provided for the respective systems, each filtering unit being provided to perform low-pass filtering on the signal on which the frequency conversion is performed by a corresponding one of the frequency converting units; and a beam forming unit for forming one or more beam signals by using the signals on each of which the low-pass filtering is performed by one of the filtering units, wherein the phase value series acquiring unit acquires phase value series in which an amount of change in phase value or a control interval of phase value is an integral multiple according to the number of systems.

Advantageous Effects of Invention

Because the antenna device according an aspect of to the present invention is configured as above, the antenna device can implement reduction in the cost and reduction in the power consumption and can improve degradation in the SNR, as compared with conventional configurations, and can also implement DBF even in a case in which the antenna device has a phased array antenna configuration of analog beam forming type.

BRIEF DESCRIPTION OF DRAWINGS

FIG. 4 is a diagram explaining the operation of the antenna device according to Embodiment 1 of the present invention, wherein

FIG. 9 is a diagram explaining the operation of the antenna device according to Embodiment 3 of the present invention, wherein

DESCRIPTION OF EMBODIMENTS

Hereafter, embodiments of the present invention will be explained in detail with reference to the drawings.

Embodiment 1

Figure 1:
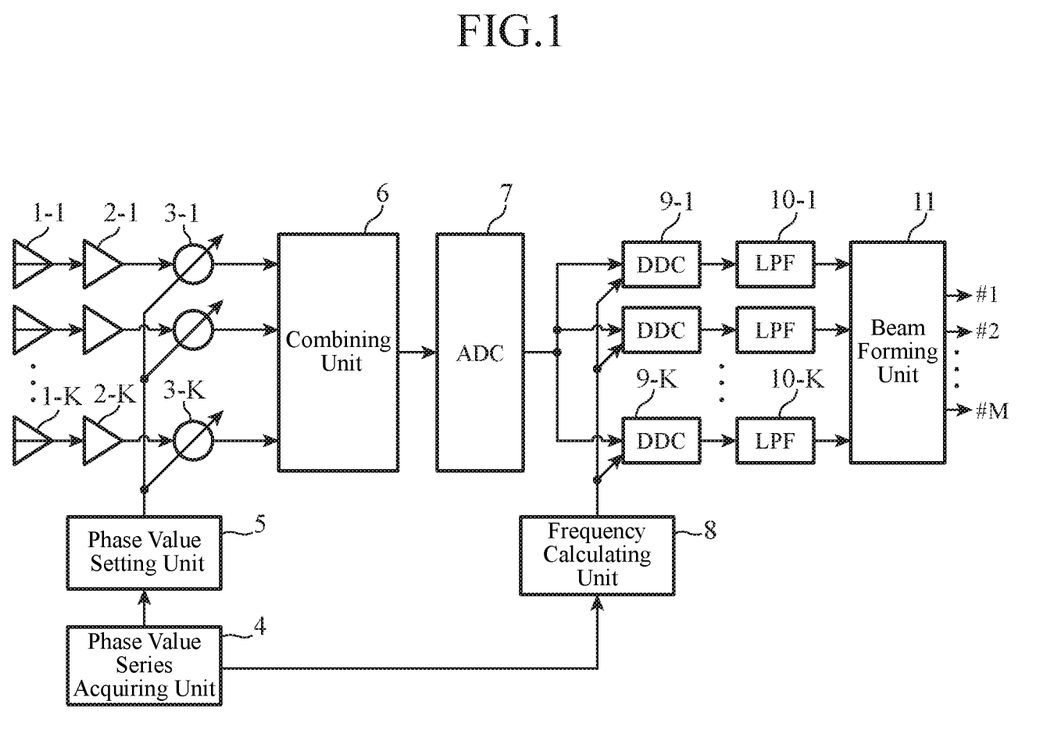
FIG. 1 is a block diagram showing an example of the configuration of an antenna device according to Embodiment 1 of the present invention.

FIG. 1 is a block diagram showing an example of the configuration of an antenna device according to Embodiment 1 of the present invention. Hereafter, a case in which the antenna device forms M beams (M is a natural number) will be explained as an example.

The antenna device includes element antennas 1 (1-1 to 1-K (K is a natural number)), low noise amplifiers (LNAs) 2 (2-1 to 2-K), phase control units 3 (3-1 to 3-K), a phase value series acquiring unit 4, a phase value setting unit 5, a combining unit 6, an AD converter (ADC) 7, a frequency calculating unit 8, frequency converting units (Digital Down Converters: DDCs) 9 (9-1 to 9-K), filtering units (Low Pass Filters: LPFs) 10 (10-1 to 10-K) and a beam forming unit 11, as shown in FIG. 1.

A plurality of systems of the element antennas 1 is provided, and each of which receives a radio wave (signal).

The LNA 2 is provided for each system and amplifies a signal received by a corresponding element antenna 1.

The phase control unit 3 is a phase shifter provided for each system and controls the phase of the signal amplified by a corresponding LNA 2. Each of these phase control units 3 performs phase control using a corresponding phase value set thereto by the phase value setting unit 5.

The phase value series acquiring unit 4 acquires phase value series in which phase values differing among the systems and changing with time are provided. In this case, the phase value series acquiring unit 4 can be configured so as to generate phase value series by itself or read data stored in a memory or the like and showing phase value series.

The phase value setting unit 5 sets a phase value to each of the phase control units 3 in accordance with the phase value series acquired by the phase value series acquiring unit 4.

Note that the phase value series acquiring unit 4, the phase value setting unit 5, and the frequency calculating unit 8, which will be described below, are implemented by program processing based on software and using a CPU.

The combining unit 6 combines the signals whose phases are controlled respectively by the plurality of phase control units 3, to generate a composite signal.

The ADC 7 digitizes the composite signal generated by the combining unit 6.

The frequency calculating unit 8 calculates a frequency shift amount for each system from the phase value series acquired by the phase value series acquiring unit 4.

The DDC 9 is provided for each system and performs frequency conversion on the composite signal digitized by the ADC 7 by using a corresponding frequency shift amount calculated by the frequency calculating unit 8. In this case, each of the DDCs 9 performs the frequency conversion on the composite signal by downconverting the frequency of the composite signal, via digital signal processing, by using a corresponding frequency shift amount.

The LPF 10 is provided for each system and performs a low-pass filtering process of allowing a component having a low frequency to pass therethrough on the composite signal on which the frequency conversion is performed by a corresponding DDC 9. As a result, the composite signal is demultiplexed into signals for the respective systems.

The beam forming unit 11 forms beam signals by using the signal on which the low-pass filtering is performed by each of the LPFs 10.

Next, an operation of the antenna device configured as explained above will be explained with reference to FIGS. 2 to 4.

Figure 2:
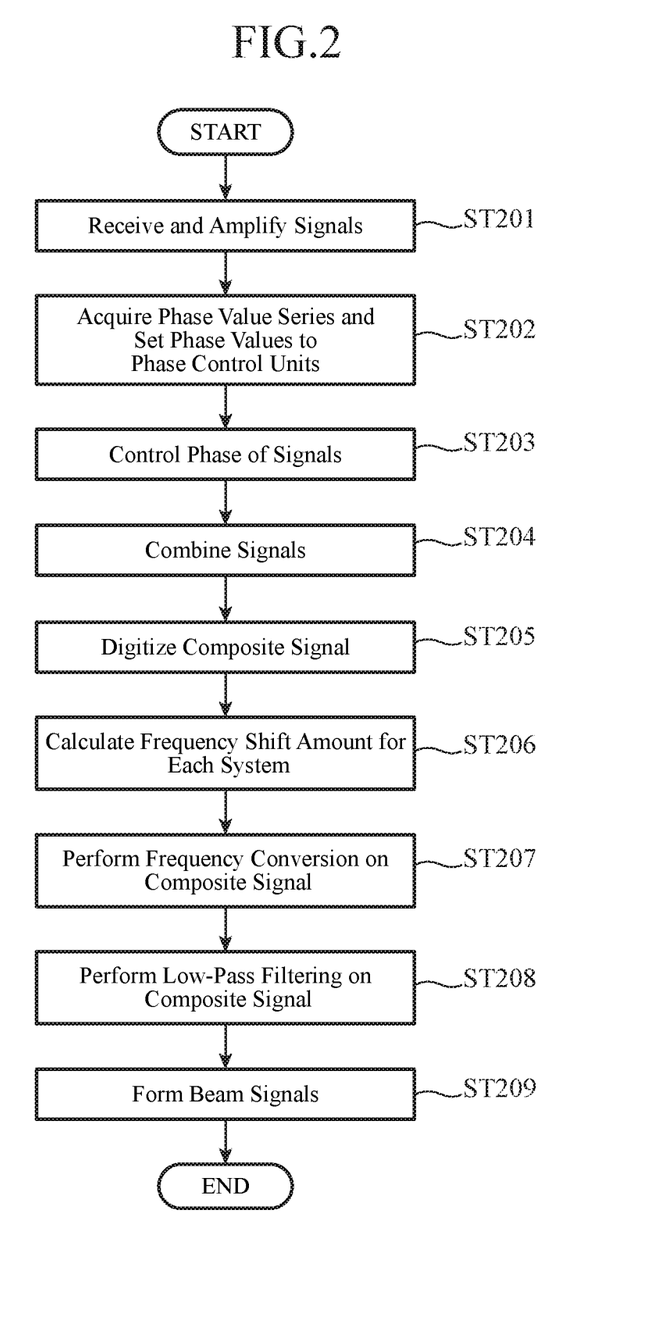
FIG. 2 is a flow chart showing an operation of the antenna device according to Embodiment 1 of the present invention.

In the operation of the antenna device according to Embodiment 1, as shown in FIG. 2, first, each of the element antennas 1 receives a radio wave (signal), and the corresponding LNA 2 amplifies this signal (step ST201).

The phase value series acquiring unit 4 acquires phase value series in which phase values differing among the systems and changing with time are provided, and the phase value setting unit 5 sets the phase values respectively to the phase control units 3 in accordance with the phase value series (step ST202).

Then, each of the phase control units 3 performs phase control on the signal amplified by the corresponding LNA 2 by using the corresponding phase value set thereto by the phase value setting unit 5 (step ST203).

In the case of a typical phased array antenna of analog beam forming type, phase control units control the phase of signals in such a way that the phase wave fronts of the signals match one another in the direction toward which the beam is oriented. In contrast, in the antenna device according to Embodiment 1, each of the phase control units 3 performs a frequency shift on the corresponding signal by increasing its phase value with time, instead of performing a phase adjusting process of making the phase wave front match the other phase wave fronts. In order to implement this process, the phase value series acquiring unit 4 acquires phase value series in which phase value increases with time.

Figure 3:
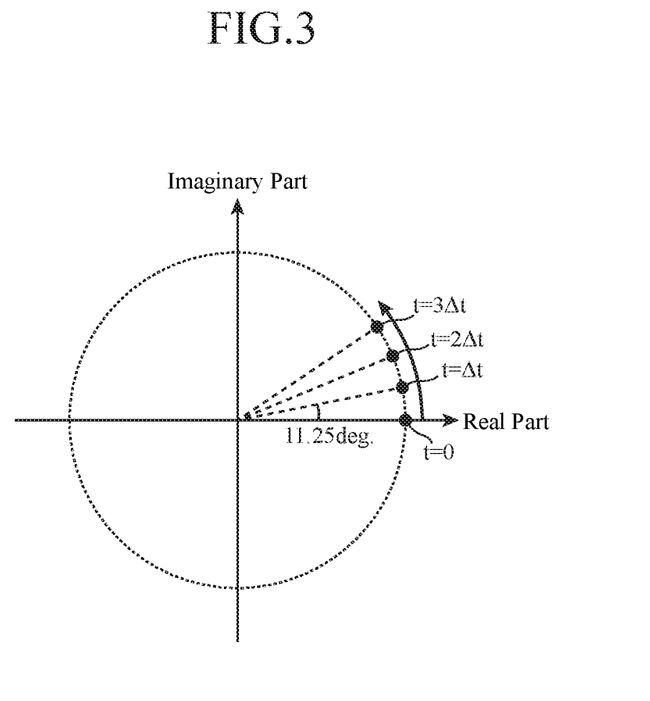
FIG. 3 is a diagram explaining the operation of the antenna device according to Embodiment 1 of the present invention.
Figure 4A:
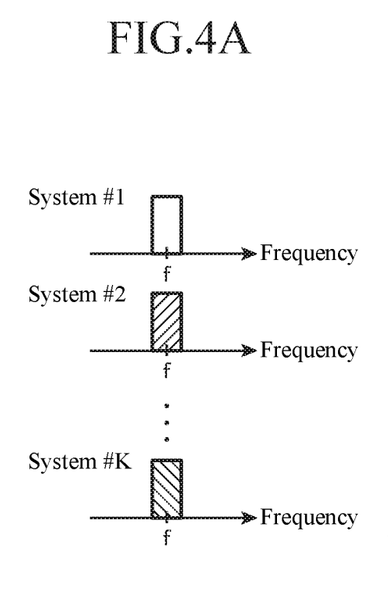
FIG. 4A is a diagram showing a signal outputted from each element antenna.
Figure 4B:
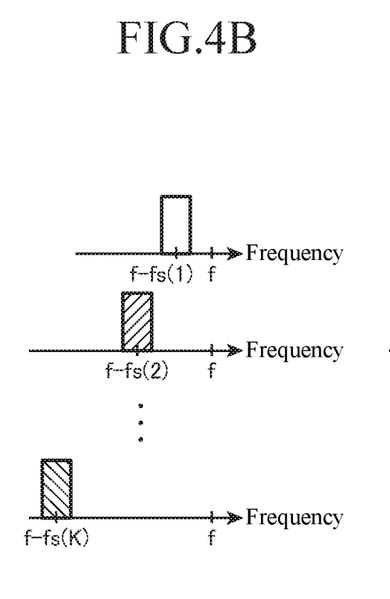
FIG. 4B is a diagram showing a signal after frequency shifting outputted from each phase control unit.

As an example, there is considered a case of using 5-bit digital phase shifters as the phase control units 3, and controlling the phase values at intervals of $\Delta t$ seconds, as shown in FIG. 3. When a phase value of θ degrees at a time t is expressed by (t, θ), for example, a phase control unit changes its phase value in such a way that the phase value changes from (0, 0), to (Δt, 11.25), to (2Δt, 22.5), to (3Δt, 33.75), and to . . . . In this case, because the phase control unit changes its phase value by a phase value of 11.25 degrees at an interval of Δt seconds, a time of 32Δt seconds is needed to rotate the phase by 360 degrees, so that the frequency can be shifted by −1/(32Δt) Hz. As shown in FIGS. 4A and 4B, the frequency is shifted by changing the phase value by a constant value at the control interval of the phase control units 3. When the frequency of the signal before frequency shifting is denoted by f, the frequency of this signal is shifted to f−1/(32Δt) by the above-mentioned phase control units 3.

By changing either the amount of change in the phase value or the control interval of the phase value among the plurality of element antennas 1, the signals can be shifted to signals having different frequencies. For example, the phase control is performed on another signal in such a way that the amount of phase change is twice as large as the above-mentioned amount of phase change, for example, in such a way that the phase value changes from (0, 0), to (Δt, 22.5), to (2Δt, 45.0), to (3Δt, 67.5), and to . . . . Alternatively, the phase control is performed on another signal in such a way that the control interval is twice as long as the above-mentioned control interval, for example, in such a way that the phase value changes from (0, 0), to (Δt, 0), to (2Δt, 11.25), to (3Δt, 11.25), and to . . . . In the former case, because the phase is rotated 22.5 degrees at an interval of Δt seconds, the frequency can be shifted by 1/(16Δt) Hz. In the latter case, because the phase is rotated 11.25 degrees at an interval of 2Δt seconds, the frequency can be shifted by 1/(64Δt) Hz. By doing in this way, the amounts of phase change in the plurality of element antennas 1 are set to different values.

Figure 4C:
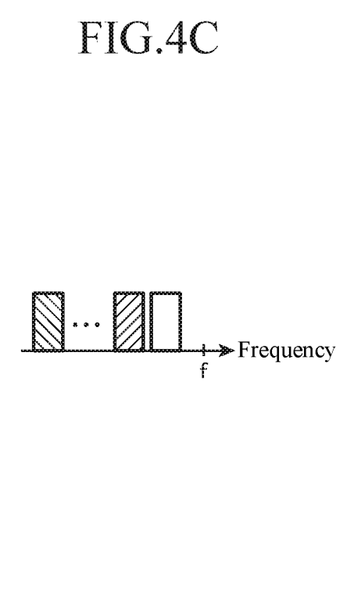
FIG. 4C is a diagram showing a signal outputted from a combining unit.

The combining unit 6 then combines the signals whose phase is controlled respectively by the phase control units 3 to generate a composite signal (frequency-division multiplexed signal), and the ADC 7 digitizes the composite signal (steps ST204 and 205). As a result, such a composite signal as shown in FIG. 4C can be acquired.

The frequency calculating unit 8 calculates a frequency shift amount fs (fs(1) to fs (K)) for each system from the phase value series acquired by the phase value series acquiring unit 4 (step ST206). As an example of the frequency shift amount fs(k) (1≤k≤K) for the k-th antenna element (1≤k≤K), one of 1/(32Δt), 1/(16Δt) and 1/(64Δt), which are mentioned above, is provided.

Each of the DDCs 9 then performs frequency conversion on the composite signal digitized by the ADC 7 by using the corresponding frequency shift amount calculated by the frequency calculating unit 8 (step ST207). At this time, each of the DDCs 9 performs the frequency conversion on the composite signal by multiplying the composite signal by a complex sinusoidal wave having a frequency f−fs(k) (15≤k≤K).

Then, each of the LPFs 10 performs the low-pass filtering process of allowing a signal having a low frequency to pass therethrough on the composite signal on which the frequency conversion is performed by the corresponding DDC 9 (step ST208). Each of the LPFs performs the filtering via this low-pass filtering in such a way that no signals associated with the other systems are included in the corresponding signal, so that the composite signal is demultiplexed into signals respectively associated with the systems.

Then, the beam forming unit 11 forms a beam signal by using the signals on which the low-pass filtering is performed by each of the LPFs 10 (step ST209). More specifically, the beam forming unit performs a DBF process by using the signals that are separated for each system, to form M beam signals.

The example of forming M beams by performing digital signal processing is shown above. However, this embodiment is not limited to this example, and the antenna device can control the amplitude phase of each of the element antennas 1 with a high degree of accuracy by performing digital signal processing, and can form beams in each of which the sidelobes are reduced.

As mentioned above, because the antenna device according to Embodiment 1 is configured so as to perform frequency division multiplexing on the signals of the systems by using the plurality of phase control units 3 to combine the signals into a composite signal, after that, digitize this composite signal, and demultiplex the digitized composite signal into signals respectively associated with the systems via digital signal processing, degradation in the SNR can be improved as compared with conventional configurations. Further, because ADCs to be disposed can be limited to the single ADC 7, the antenna device can implement reduction in the cost and reduction in the power consumption, as compared with conventional configurations. Further, because the antenna device is configured so as to change the phase value of each phase control unit 3 in accordance with time, and perform frequency division multiplexing on the signals of the systems, DBF can be implemented by simply making an improvement to the digital signal processing even if the antenna device has a phased array antenna configuration of analog beam forming type.

Embodiment 2

In Embodiment 1, the example in which the antenna device digitizes the composite signal by using the ADC 7, and, after that, demultiplexes the digitized composite signal into signals respectively associated with the systems by using the DDCs 9 and the LPFs 10 is shown. In contrast with this, in Embodiment 2, an example in which an antenna device shifts the frequencies of signals of a plurality of systems to frequencies having an orthogonality relation by using phase control units 3, to perform frequency division multiplexing on the signals to generate a composite signal, and performs a discrete Fourier transform on the composite signal which is digitized by an ADC 7, to demultiplex the composite signal into signals will be explained.

Figure 5:
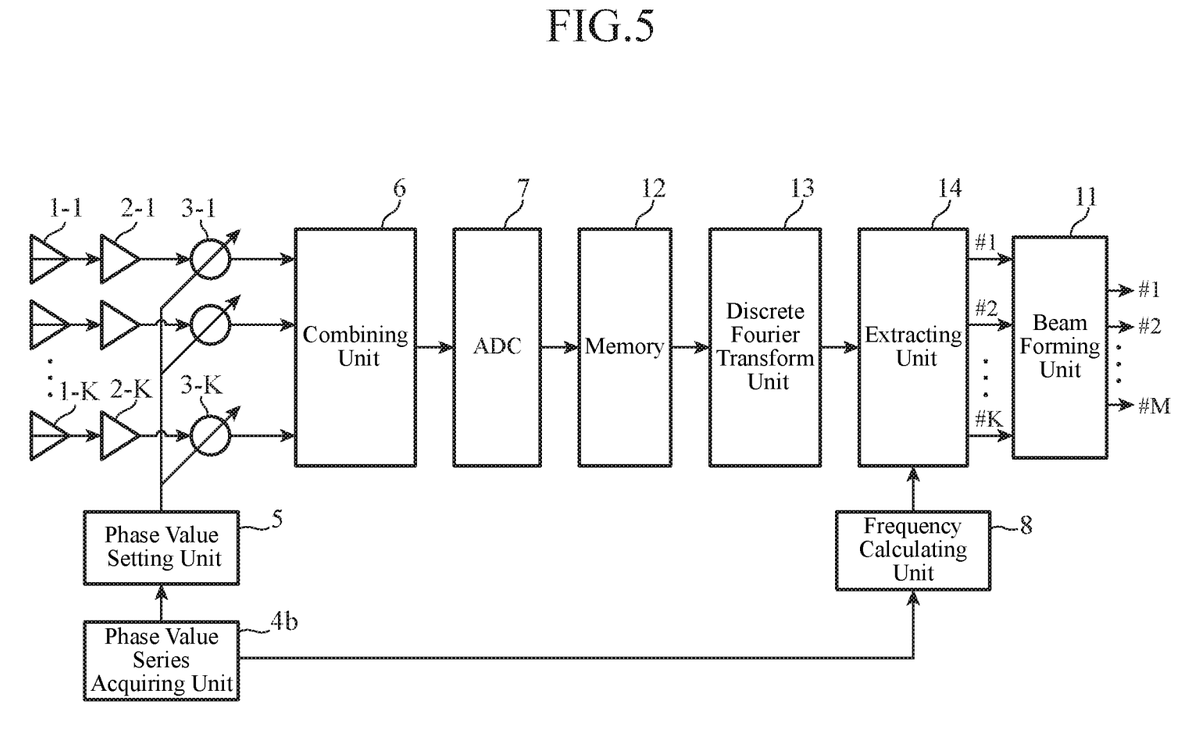
FIG. 5 is a block diagram showing an example of the configuration of an antenna device according to Embodiment 2 of the present invention.

FIG. 5 is a block diagram showing an example of the configuration of the antenna device according to Embodiment 2 of the present invention. The antenna device according to Embodiment 2 shown in this FIG. 5 is the one in which the DDCs 9 and the LPFs 10 are eliminated from the components of the antenna device according to Embodiment 1 shown in FIG. 1, a memory 12, a discrete Fourier transform unit 13 and an extracting unit 14 are added, and the phase value series acquiring unit 4 is replaced with a phase value series acquiring unit 4b. The other components are the same as those according to Embodiment 1, and an explanation will be made as to only a different portion with the other components being designated by the same reference characters.

The phase value series acquiring unit 4b acquires phase value series in which phase values differing among the systems and changing with time are provided in such a way that one frequency of signal of the systems is shifted to a frequency having an orthogonality relation to the other frequencies. In this case, the phase value series acquiring unit 4*b* can be configured so as to generate phase value series by itself or read data stored in a memory or the like and showing phase value series.

Note that a phase value setting unit 5 according to Embodiment 2 sets a phase value to each of the phase control units 3 in accordance with the phase value series acquired by the phase value series acquiring unit 4*b*. Further, a frequency calculating unit 8 according to Embodiment 2 calculates a frequency shift amount for each system from the phase value series acquired by the phase value series acquiring unit 4*b*.

The memory 12 records the every composite signal digitized by the ADC 7.

The discrete Fourier transform unit 13 reads the composite signal digitized by the ADC 7 from the memory 12, and performs frequency conversion on this composite signal by performing a discrete Fourier transform on the composite signal.

The extracting unit 14 extracts, for each system, a signal corresponding to the frequency after frequency shifting that is based on the frequency shift amount calculated by the frequency calculating unit 8, from the composite signal on which the frequency conversion is performed by the discrete Fourier transform unit 13.

The discrete Fourier transform unit 13 and the extracting unit 14 are implemented by program processing based on software and using a CPU.

Further, a beam forming unit 11 according to Embodiment 2 forms beam signals by using each signal extracted by the extracting unit 14.

Next, an operation of the antenna device according to Embodiment 2 will be explained with reference to FIG. 6.

Figure 6:
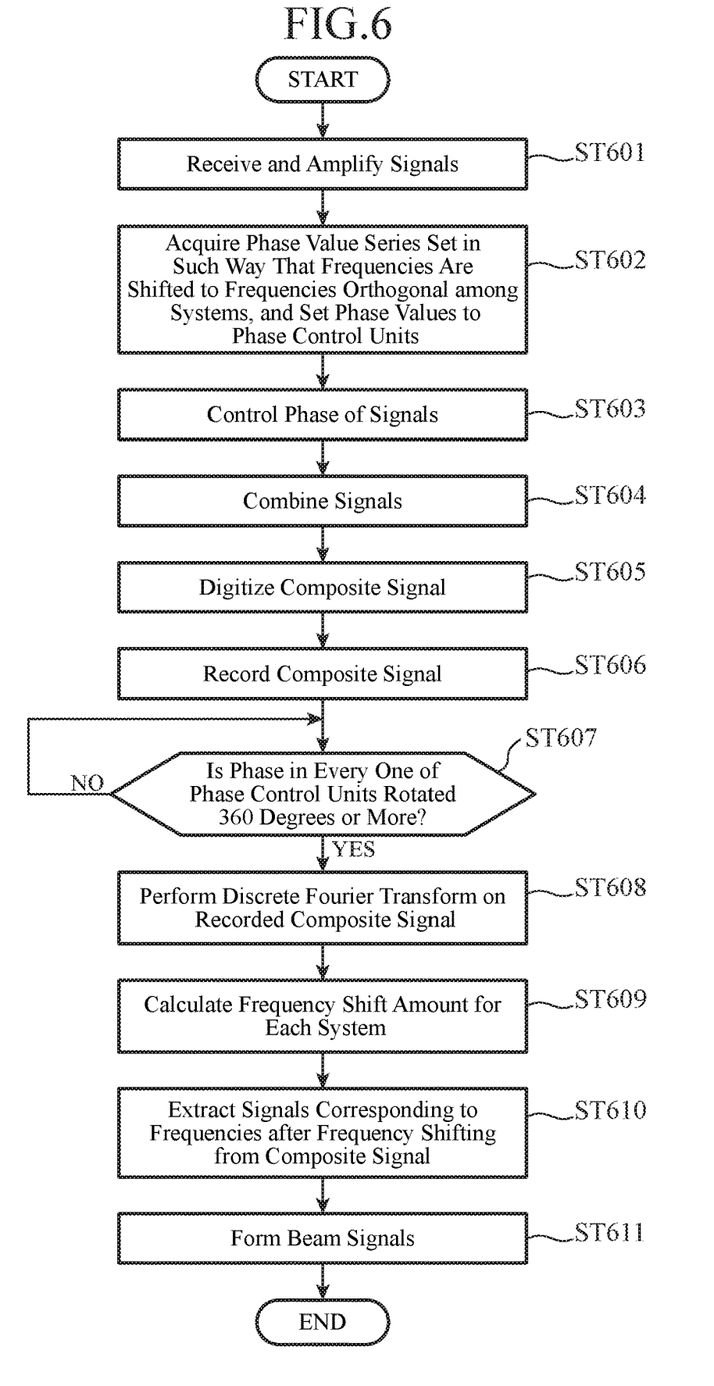
FIG. 6 is a flow chart showing an operation of the antenna device according to Embodiment 2 of the present invention.

In the operation of the antenna device according to Embodiment 2, as shown in FIG. 6, first, each of the element antennas 1 receives a radio wave (signal), and a corresponding LNA 2 amplifies this signal (step ST601).

The phase value series acquiring unit 4*b* acquires phase value series in which phase values differing among the plurality of element antennas and changing with time are provided in such a way that one frequency of signal of the systems is shifted to a frequency having an orthogonality relation to the other frequencies, and the phase value setting unit 5 sets a phase value to each phase control unit 3 in accordance with this phase value series (step ST602). For example, when the resolution of observable frequencies in the next-stage discrete Fourier transform is denoted by fres, the phase value series acquiring unit acquires phase value series in which the frequency f-fs(k) (1≤k≤K) after phase controlling is an integral multiple of fres.

Then, each of the phase control units 3 performs phase control on the signal amplified by the corresponding LNA 2 by using a corresponding phase value set thereto by the phase value setting unit 5 (step ST603).

Then, a combining unit 6 combines the signals whose phase is controlled respectively by the phase control units 3 to generate a composite signal (frequency-division multiplexed signal), the ADC 7 digitizes the composite signal, and the memory 12 records the every digitized composite signal (steps ST604 to ST606).

Then, the discrete Fourier transform unit 13 determines whether the phase in every one of the phase control units 3 is rotated 360 degrees or more (step ST607). When the discrete Fourier transform unit, in this step ST607, determines that the phase in at least one of the phase control units 3 is not rotated 360 degrees or more, the sequence returns to step ST607 again and the antenna device enters a standby state.

In contrast, when, in step ST607, determining that the phase in every one of the phase control units 3 is rotated 360 degrees or more, the discrete Fourier transform unit 13 reads the composite signal digitized by the ADC 7 from the memory 12, and performs frequency conversion on this composite signal by performing a discrete Fourier transform on the composite signal (step ST608).

The frequency calculating unit 8 calculates frequency shift amounts fs (fs(1) to fs(K)) respectively for the systems from the phase value series generated by the phase value series acquiring unit 4*b* (step ST609).

Then, the extracting unit 14 extracts, for each system, a signal corresponding to the frequency after frequency shifting that is based on the frequency shift amount calculated by the frequency calculating unit 8, from the composite signal on which the frequency conversion is performed by the discrete Fourier transform unit 13 (step ST610). More specifically, because complex information (amplitude and phase) about orthogonal frequency components can be acquired via the discrete Fourier transform, the extracting unit 14 outputs complex information about the frequency which has been shifted by a frequency shift amount acquired by the frequency calculating unit 8. As a result, the composite signal can be demultiplexed into signals for the respective systems.

Then, the beam forming unit 11 forms a beam signals by using the signals extracted by the extracting unit 14 (step ST611).

As explained above, because the antenna device according to Embodiment 2 is configured so as to perform frequency division multiplexing on the signals of the systems by using the plurality of phase control units 3 to combine the signals into a composite signal, after that, digitize this composite signal, and demultiplex the digitized composite signal into signals of the systems via digital signal processing, there can be provided the same advantages as those provided by Embodiment 1.

Further, the antenna device according to Embodiment 2 is configured so as to shift the frequencies of the signals of the plurality of element antennas to orthogonal frequencies by using the plurality of phase control units 3, the antenna device can use a discrete Fourier transform for the process of demultiplexing a signal after frequency division multiplexing into signals respectively associated with the systems, and can reduce the load caused by the digital signal processing, as compared with Embodiment 1.

Embodiment 3

In Embodiments 1 and 2, the example of changing the phase value in each phase control unit 3, and shifting a frequency of the signal of a system is shown. In contrast with this, in Embodiment 3, an example in which an antenna device acquires phase value series based on orthogonal codes by a phase value series acquiring unit 4*c*, controls the phase of signal of each system by using the phase value series to orthogonalize the phases, and combines the signals is shown. More specifically, an example in which the antenna device performs code division multiplexing on the signals of the systems to generate a composite signal, and demultiplexes this composite signal by performing digital signal processing will be shown.

Figure 7:
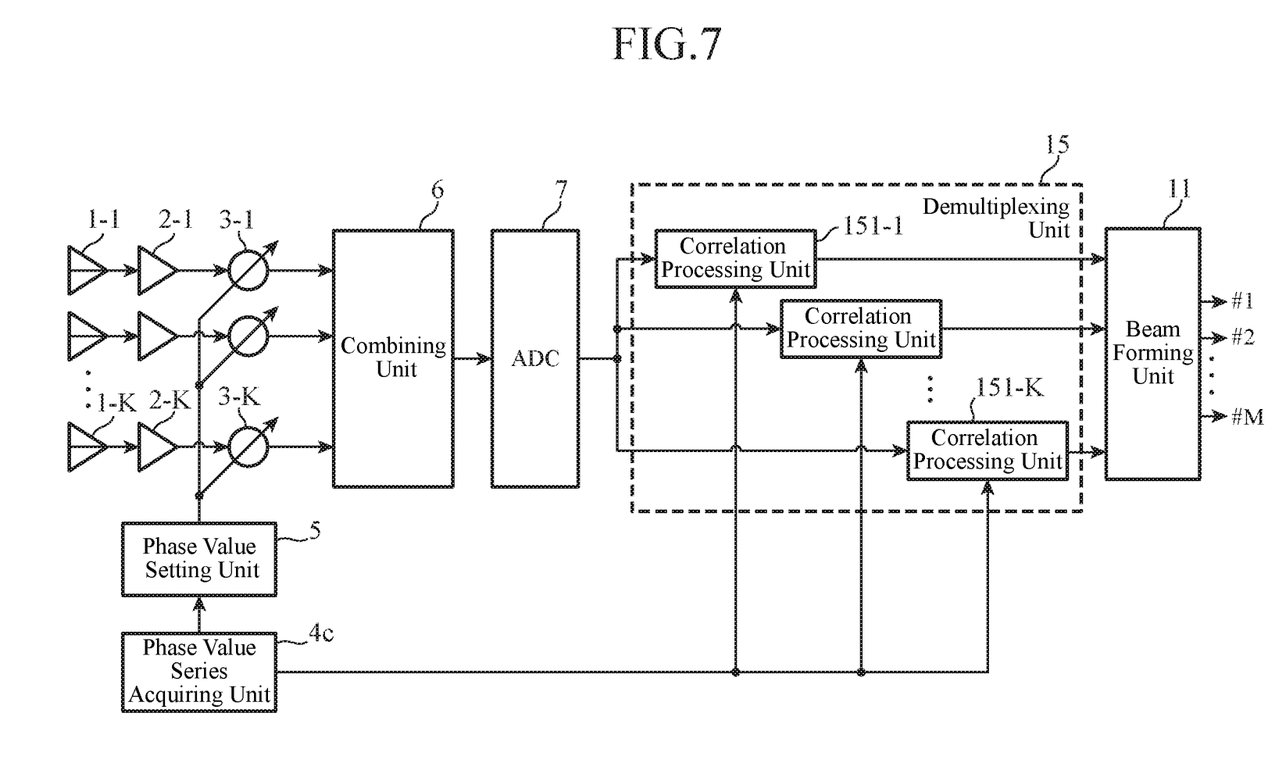
FIG. 7 is a block diagram showing an example of the configuration of an antenna device according to Embodiment 3 of the present invention.

FIG. 7 is a block diagram showing an example of the configuration of the antenna device according to Embodiment 3 of the present invention. The antenna device according to Embodiment 3 shown in FIG. 7 is the one in which the DDCs 9 and the LPFs 10 are eliminated from the components of the antenna device according to Embodiment 1 shown in FIG. 1, a demultiplexing unit 15 is added, and the phase value series acquiring unit 4 is changed to a phase value series acquiring unit 4c. The other components are the same as those according to Embodiment 1, and an explanation will be made as to only a different portion.

The phase value series acquiring unit 4c acquires phase value series in which phase values having an orthogonality relation among the systems and changing with time are provided, in accordance with orthogonal codes. In this case, the phase value series acquiring unit 4c can be configured so as to generate phase value series by itself or read data stored in a memory or the like and showing phase value series.

Note that a phase value setting unit 5 according to Embodiment 3 sets a phase value to each phase control unit 3 in accordance with the phase value series acquired by the phase value series acquiring unit 4c.

The demultiplexing unit 15 has a plurality of correlation processing units 151 (151-1 to 151-K) respectively for the plurality of systems, and performs a correlation process of acquiring a correlation between a composite signal digitized by an ADC 7 and the phase value series acquired by the phase value series acquiring unit 4c, thereby demultiplexing the composite signal into signals for the respective systems.

Here, the demultiplexing unit 15 carries out the above-mentioned correlation process by performing a convolution operation in a time domain by using the composite signal digitized by the ADC 7 and the phase value series acquired by the phase value series acquiring unit 4c. As an alternative, the demultiplexing unit 15 can perform the above-mentioned correlation process by performing an inner product operation in the frequency domain about a Fourier transform by using the signals digitized by the ADC 7 and the phase value series acquired by the phase value series acquiring unit 4c.

The phase value series acquiring unit 4c and the demultiplexing unit 15 are implemented by program processing based on software and using a CPU.

Further, a beam forming unit 11 according to Embodiment 3 forms beam signals by using the signals after demultiplexing by the demultiplexing unit 15.

Next, an operation of the antenna device according to Embodiment 3 will be explained with reference to FIGS. 8 and 9.

Figure 8:
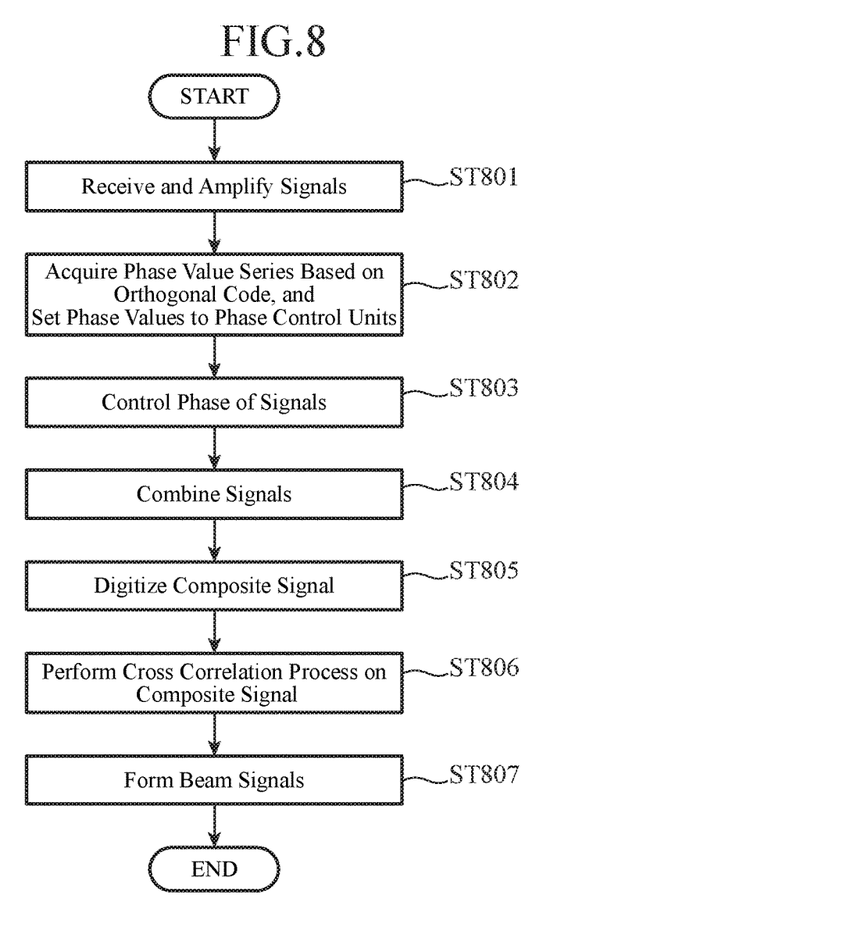
FIG. 8 is a flow chart showing an operation of the antenna device according to Embodiment 3 of the present invention.

In the operation of the antenna device according to Embodiment 3, as shown in FIG. 8, first, each of the element antennas 1 receives a radio wave (signal), and a corresponding LNA 2 amplifies this signal (step ST801).

The phase value series acquiring unit 4c acquires phase value series in which phase values having an orthogonality relation among the systems and changing with time are provided, in accordance with orthogonal codes, and the phase value setting unit 5 sets a phase value to each phase control unit 3 in accordance with this phase value series (step ST802). More specifically, the phase value series acquiring unit 4c generates a group of code patterns which are orthogonal to one another among the systems. At this time, a value which each code can have can be a multiple value or a binary value.

Figure 9A:
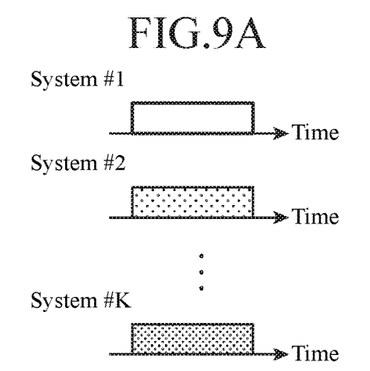
FIG. 9A is a diagram showing a signal outputted from each element antenna.
Figure 9B:
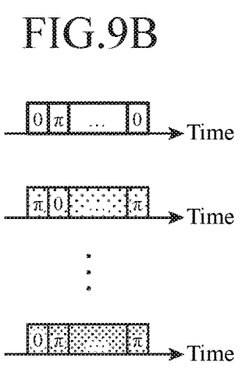
FIG. 9B is a diagram showing a signal after phase modulation outputted from each phase control unit.

Then, each phase control unit 3 performs phase control on the signal amplified by the corresponding LNA 2 by using the corresponding phase value set thereto by the phase value setting unit 5 (step ST803). By performing phase control based on an orthogonal code in this way, each of the phase control units can perform a kind of phase modulation on the signal of a corresponding one of the systems, so that an orthogonalizing process can be performed on the signal. For example, in the case in which each orthogonal code is binary, when the orthogonal code corresponding to the k-th element antenna 1-$k$ (1≤$k$≤K) is 1, the phase value of the phase control unit 3-$k$ is set to 0 degrees, whereas when the orthogonal code corresponding to the k-th element antenna 1-$k$ is −1, the phase value of the phase control unit 3-$k$ is set to 180 degrees ($\pi$ [rad]), as shown in FIGS. 9A and 9B.

Figure 9C:
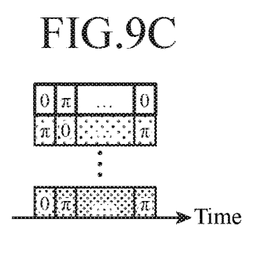
FIG. 9C is a diagram showing a signal outputted from a combining unit.

Then, a combining unit 6 combines the signals whose phase is controlled by each phase control unit 3 to generate a composite signal (code-division multiplexed signal), the ADC 7 digitizes this composite signal (steps ST804 and ST805). As a result, such a composite signal as shown in FIG. 9C can be acquired.

Then, the demultiplexing unit 15 performs the correlation process of acquiring a correlation between the composite signal digitized by the ADC 7 and the phase value series acquired by the phase value series acquiring unit 4c in each correlation processing unit 151, thereby demultiplexing the composite signal into signals respectively associated with the systems (step ST806). At this time, because the signals of the systems are orthogonalized as shown in FIG. 9, the composite signal can be demultiplexed into signals respectively associated with the systems via this correlation process.

Then, the beam forming unit 11 forms beam signals by using the signals after demultiplexing by the demultiplexing unit 15 (step ST807).

As explained above, because the antenna device according to Embodiment 3 is configured so as to perform orthogonal coding on the signals of the systems by using the plurality of phase control units 3, to perform code division multiplexing on the signals, combine the signals to generate a composite signal, after that, digitize the composite signal, and demultiplex the composite signal into signals respectively associated with the systems by performing the correlation process, degradation in the SNR can be improved as compared with conventional configurations. Further, because ADCs to be provided can be limited to the single ADC 7, the antenna device can implement reduction in the cost and reduction in the power consumption, as compared with conventional configurations. Further, because the antenna device is configured so as to change the phase value of each of the phase control units 3 with time, and perform code division multiplexing on the signals of the systems, DBF can be implemented by simply making an improvement to the digital signal processing even if the antenna device has a phased array antenna configuration of analog beam forming type.

Further, because the antenna device according to Embodiment 3 performs code division multiplexing by using each of the phase control units 3, it is not necessary to enlarge the frequency band to be processed by the ADC 7. Therefore, DBF can be implemented without using an expensive ADC 7.

Embodiment 4

Figure 10:
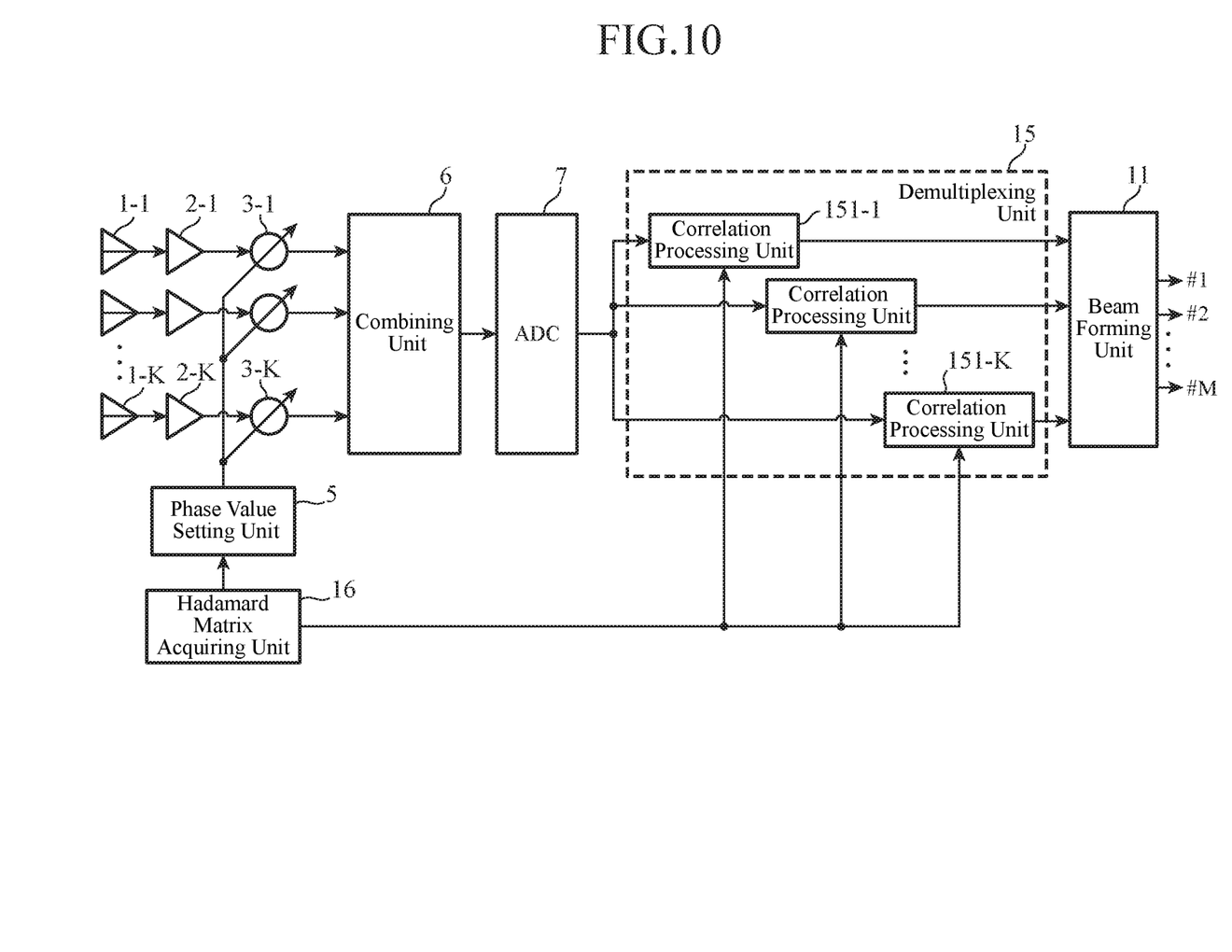
FIG. 10 is a block diagram showing an example of the configuration of an antenna device according to Embodiment 4 of the present invention.

FIG. 10 is a block diagram showing an example of the configuration of an antenna device according to Embodiment 4 of the present invention. The antenna device according to Embodiment 4 shown in FIG. 10 is the one in which the antenna device uses an Hadamard matrix acquiring unit 16 as the phase value series acquiring unit 4c of the antenna device according to Embodiment 3 shown in FIG. 7. The other components are the same as those according to Embodiment 1, and an explanation will be made as to only a different portion with the other components being designated by the same reference characters.

The Hadamard matrix acquiring unit 16 acquires as phase value series based on orthogonal codes an Hadamard matrix having dimensions that are equal to or greater than the number of systems. At this time, the Hadamard matrix acquiring unit 16 can be configured so as to generate an Hadamard matrix by itself, or read data stored in a memory or the like and showing an Hadamard matrix.

Note that a phase value setting unit 5 according to Embodiment 4 sets a phase value to each phase control unit 3 in accordance with the Hadamard matrix acquired by the Hadamard matrix acquiring unit 16. Further, a demultiplexing unit 15 according to Embodiment 4 performs a correlation process of acquiring a correlation between a composite signal digitized by an ADC 7 and the Hadamard matrix acquired by the Hadamard matrix acquiring unit 16 by using each of correlation processing units 151, thereby demultiplexing the digitized composite signal into signals respectively associated with the systems.

Further, the operation of the antenna device according to Embodiment 4 is the same as the operation of the antenna device according to Embodiment 3, with the exception that the operation of the phase value series acquiring unit 4c in the operation of the antenna device according to Embodiment 3 is replaced by the operation of the Hadamard matrix acquiring unit 16, and the explanation of the same operation will be omitted hereafter.

This Hadamard matrix is a square matrix, and each element of the matrix has a value which is either +1 or −1. Further, any two row vectors are orthogonal to each other. This Hadamard matrix can be calculated in accordance with the following equation (1).

$$H_{2N} = \begin{bmatrix} +H_N & +H_N \\ +H_N & -H_N \end{bmatrix} \quad (1)$$

$$H_1 = [1]$$

Hereafter, the case in which the number of systems is 4 (K=4) will be explained as an example. In this case, the Hadamard matrix acquired by the Hadamard matrix acquiring unit 16 is given by the following equation (2).

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (2)$$

In this Hadamard matrix, each row vector is orthogonal code series for one of the systems. Then, assign a phase value of 0 (zero) degrees and 180 degrees respectively to each element value of 1 and −1. In this case, for example, the phase value for the received signal of the second system is controlled as follows: (0 degrees, 180 degrees, 0 degrees, 180 degrees).

By using this Hadamard matrix, orthogonal codes can be formed with two kinds of phase values, 0 degrees and 180 degrees. These codes can be used regardless of the number of bits of a phase shifter used in each phase control unit 3.

The order of an Hadamard matrix is an even number, as illustrated above. Therefore, when the number, K, of systems is odd, an Hadamard matrix having even dimensions that is greater than the number K of systems is generated. In this case, K row vectors of the Hadamard matrix are used as orthogonal codes for the systems.

As explained above, according to Embodiment 4 in which an Hadamard matrix is used as phase value series the same advantages as those provided by Embodiment 3 can be provided.

Further, according to Embodiment 4, because the phases of the signals are controlled using binary phase value series, the number of bits of each phase control unit 3 can be reduced and DBF can be implemented at a low cost.

Note that any combination of the embodiments, or any modification or omission of components of the embodiments may be freely made within the scope of the invention.

INDUSTRIAL APPLICABILITY

Because the antenna device according to the present invention can implement reduction in the cost and reduction in the power consumption and can improve degradation in the SNR, as compared with conventional configurations, and can also implement DBF even in a case in which the antenna device has a phased array antenna configuration of analog beam forming type, the antenna device is suitable for use as an antenna device or the like that performs a DBF process of forming a beam by using digital signals.

REFERENCE SIGNS LIST

1 element antenna, 2 low noise amplifier (LNA), 3 phase control unit, 4, 4b, 4c phase value series acquiring unit, 5 phase value setting unit, 6 combining unit, 7 AD converter (ADC), 8 frequency calculating unit, 9 frequency converting unit (DDC), 10 filtering unit (LPF), 11 beam forming unit, 12 memory, 13 discrete Fourier transform unit, 14 extracting unit, 15 demultiplexing unit, 16 Hadamard matrix acquiring unit, and 151 correlation processing unit.

The invention claimed is:

1. An antenna device comprising:
   a plurality of element antennas for receiving signals, each element antenna being provided in an individual system;
   a plurality of phase shifters provided for the respective systems, each phase shifter being provided to control a phase of a signal received by a corresponding one of the element antennas;
   a phase value series acquirer for acquiring phase value series in which phase values differing among the systems and changing with time are provided;
   a phase value setter for setting a phase value to each phase shifter in accordance with the phase value series acquired by the phase value series acquirer;
   a combiner for combining signals whose phases are controlled respectively by the plurality of phase shifters to provide a composite signal;
   an AD converter for digitizing the composite signal provided from the combiner;
   a frequency calculator for calculating a frequency shift amount for each system from the phase value series acquired by the phase value series acquirer;
   a plurality of frequency converters provided for the respective systems, each frequency converter being provided to perform frequency conversion on the signal digitized by the AD converter by using a corresponding frequency shift amount calculated by the frequency calculator;

a plurality of filters provided for the respective systems, each filter being provided to perform low-pass filtering on the signal on which the frequency conversion is performed by a corresponding one of the frequency converters; and a beam former for forming one or more beam signals by using the signals on each of which the low-pass filtering is performed by one of the filters, wherein the phase value series acquirer acquires phase value series in which an amount of change in phase value or a control interval of phase value is an integral multiple according to the number of systems.

2. An antenna device comprising:

a plurality of element antennas for receiving signals, each element antenna being provided in an individual system;

a plurality of phase shifters provided for the respective systems, each phase shifter being provided to control a phase of a signal received by a corresponding one of the element antennas;

a phase value series acquirer for acquiring phase value series in which phase values differing among the systems and changing with time are provided so as to shift the frequencies of the signals to frequencies having an orthogonality relation among the systems;

a phase value setter for setting a phase value to each phase shifter in accordance with the phase value series acquired by the phase value series acquirer;

a combiner for combining signals whose phases are controlled respectively by the plurality of phase shifters to provide a composite signal;

an AD converter for digitizing the composite signal provided from the combiner;

a discrete Fourier transformer for performing frequency conversion on the signal digitized by the AD converter;

a frequency calculator for calculating a frequency shift amount for each system from the phase value series acquired by the phase value series acquirer acquiring;

an extractor for extracting, from the signal on which the frequency conversion is performed by the discrete Fourier transformer, a signal that corresponds to a frequency after frequency shifting for each system on a basis of the frequency shift amount calculated for each system by the frequency calculator; and a beam former for forming one or more beam signals by using each signal extracted by the extractor.

* * * * *

UNITED STATES PATENT AND TRADEMARK OFFICE
CERTIFICATE OF CORRECTION

PATENT NO. : 10,284,239 B2
APPLICATION NO. : 15/539765
DATED : May 7, 2019
INVENTOR(S) : Tasuku Kuriyama et al.

Page 1 of 1

It is certified that error appears in the above-identified patent and that said Letters Patent is hereby corrected as shown below:

In the Claims

In the Column 14, the 15th line of Claim 2 should be changed from "acquired by the phase value series acquirer acquiring;" to --acquired by the phase value series acquirer;--.

Signed and Sealed this
Twenty-fifth Day of June, 2019

Andrei Iancu
*Director of the United States Patent and Trademark Office*